(12) United States Patent
Bonagiri et al.

(10) Patent No.: US 9,762,672 B2
(45) Date of Patent: Sep. 12, 2017

(54) DYNAMIC NODE GROUP ALLOCATION

(71) Applicant: International Business Machines Corporation, Armonk, NY (US)

(72) Inventors: Krishna K. Bonagiri, Ambajipet (IN); Eric A. Jacobson, Arlington, MA (US); Yong Li, Newton, MA (US); Ron E. Liu, San Jose, CA (US); Xiaoyan Pu, Chelmsford, MA (US)

(73) Assignee: International Business Machines Corporation, Armonk, NY (US)

( * ) Notice: Subject to any disclaimer, the term of this patent is extended or adjusted under 35 U.S.C. 154(b) by 218 days.

(21) Appl. No.: 14/740,050

(22) Filed: Jun. 15, 2015

(65) Prior Publication Data

US 2016/0366224 A1    Dec. 15, 2016

(51) Int. Cl.
  *G06F 15/16*    (2006.01)
  *H04L 29/08*    (2006.01)
  *H04L 12/923*   (2013.01)
  *G06F 17/30*    (2006.01)

(52) U.S. Cl.
  CPC .... *H04L 67/1097* (2013.01); *G06F 17/30194* (2013.01); *H04L 47/762* (2013.01)

(58) Field of Classification Search
  CPC ............... G06F 17/30194; G06F 17/30; G06F 17/30545; G06F 3/061; G06F 17/30445; G06F 11/3006; H04L 67/1097; H04L 41/0893
  See application file for complete search history.

(56) References Cited

U.S. PATENT DOCUMENTS

| | | | |
|---|---|---|---|
| 9,063,992 B2 | 6/2015 | Bhide et al. | |
| 2009/0018996 A1 | 1/2009 | Hunt et al. | |
| 2011/0060157 A1 | 3/2011 | Glaser et al. | |
| 2011/0145367 A1* | 6/2011 | Ananthanarayanan | H04L 67/2842 709/219 |
| 2012/0311581 A1 | 12/2012 | Balmin et al. | |
| 2013/0290957 A1 | 10/2013 | Li et al. | |
| 2013/0318525 A1 | 11/2013 | Palanisamy et al. | |
| 2014/0059290 A1 | 2/2014 | Ross et al. | |

(Continued)

OTHER PUBLICATIONS

IP.com, "A Method of Expeditiously Detecting and Partitioning Disks for Commissioning Slaves in Hadoop Cluster", Jun. 13, 2013, An IP.com Prior Art Database Technical Disclosure, IP.com No. 000228209, retrieved from the Internet at <URL: http://null/IPCOM/000228209>, Total 7 pp.

(Continued)

*Primary Examiner* — Tauqir Hussain
*Assistant Examiner* — Kamran Mohammadi
(74) *Attorney, Agent, or Firm* — A. Imtiaz Billah

(57) ABSTRACT

Provided are techniques for improving data locality for parallel applications running in a big data distributed file system with a dynamic node group. In response to a consumer job starting to read one or more files in a big data distributed file system having multiple nodes, node group information for the one or more files to be read is retrieved, wherein the node group information identifies nodes from the multiple nodes on which a producer job wrote the one or more files, and the consumer job is assigned to the nodes identified by the node group information to allow for local reading of the one or more files by the consumer job.

9 Claims, 12 Drawing Sheets

(56) References Cited

U.S. PATENT DOCUMENTS

| | | |
|---|---|---|
| 2014/0059310 A1 | 2/2014 | Du et al. |
| 2014/0245298 A1 | 8/2014 | Zhou et al. |
| 2014/0358845 A1 | 12/2014 | Mundlapudi et al. |
| 2015/0081619 A1 | 3/2015 | Brown et al. |
| 2015/0201036 A1* | 7/2015 | Nishiki ............... H04L 67/1095 709/224 |
| 2015/0254330 A1 | 9/2015 | Chan et al. |

OTHER PUBLICATIONS

IP.com, "Method for Generating Secure and Highly Available Data for Hadoop Processing", Sep. 10, 2014, An IP.com Prior Art Database Technical Disclosure, IP.com No. 000238663, retrieved from the Internet at <URL: http://null/IPCOM/000238663, Total 6 pp.

IP.com, "System and method for Hadoop Application Monitoring", Sep. 18, 2013, an IP.com Prior Art Database Technical Disclosure, IP.com No. 000230912, retrieved from the Internet at <URL: http://null/IPCOM/000230912>, Total 4 pp.

Mell, P. and T. Grance, "Effectively and Securely Using the Cloud Computing Paradigm", [online], Oct. 7, 2009, retrieved from the Internet at <URL: http://csrc.nist.gov/groups/SNS/cloud-computing/cloud-computing-v26.ppt>, Total 80 pp.

Mell, P. and T. Grance, "The NIST Definition of Cloud Computing (Draft)", Jan. 2011, Computer Security Division Information Technology Laboratory National Institute of Standards and Technology, Total 7 pp.

Fiori, J., "Leverage Existing File-based Applications with Hadoop", [online], May 13, 2013. [Retrieved on Jun. 15, 2015]. Retrieved from the Internet at <URL: https://www.mapr.com/blog/leverage-existing-file-based-applications-hadoop#.VX8_XEbQiuw>, Total 18 pp.

Mirantis, A.L., "Improving Data Processing Performance with Hadoop Data Locality", [online], Feb. 28, 2014. [Retrieved on Jun. 15, 2015]. Retrieved from the Internet at <URL: https://www.mirantis.com/blog/improving-data-processing-performance-hadoop-data-locality/>, Total 9 pp.

Pucher, A., "Auto-Scaling with Apache Helix and Apache YARN", [online], posted on Sep. 24, 2013. [Retrieved on Jun. 15, 2015]. Retrieved from the Internet at <URL: https://engineering.linkedin.com/cluster-management/auto-scaling-apache-helix-and-apach . . . >, Total 5 pp.

IP.com, "A Service-oriented Methodology of Server Resources Allocation and Relocation with Dynamically Expanded Resources Manager", Dec. 5, 2013, An IP.com Prior Art Database Technical Disclosure, IP.com No. 00233271, retrieved from the Internet at <URL: http://null/IPCOM/000233271>, Total 16 pp.

Vavilapalli, V.K., A.C. Murthy, C. Douglas, S. Agarwal, M. Konar, R. Evans, T. Graves, J. Lowe, H. Shah, S. Seth, B. Saha, C. Curino, O. O'Malley, S. Radia, B. Reed, and E. Baldeschwieler, "Apache Hadoop YARN: Yet Another Resource Negotiator", SoCC'13, Oct. 1-3, 2013, Santa Clara, California, USA, ACM 978-1-4503-2428-1, © 2013 ACM, Inc., Total 16 pp.

Hogqvist, M., "Architecture and Self-Tuning of a DISC-system", 23rd IEEE International Parallel & Distributed Processing Symposium (IPDPS), 2009, IEEE Computer Society, Total 3 pp.

Bonagiri et al., "Data Locality in Data Integration Applications", U.S. Appl. No. 15/050,565, filed Feb. 23, 2016, 32 pages.

IBM, "Appendix P: IBM Patents or Patent Applications Treated as Related", 2 pages, dated Feb. 24, 2016.

Hogqvist, M., "Architecture and Self-Tuning of a DISC-system", 23rd IEEE International Parallel & Distributed Processing Symposium (IPDPS), 2009, IEEE Computer Society, Total 3 pp.

Chung et al., "Maximizing data locality in distributed systems", Journal of Computer and System Sciences 72 (2006) 1309-1316, Available online Aug. 24, 2006, pp. 1309-1316, doi:10.1016/jjcss.2006.07.001, © 2006 Elsevier Inc.

Gu et al., "Towards Efficient and Simplified Distributed Data Intensive Computing", IEEE Transactions on Parallel and Distributed Systems, Manuscript ID, Manuscript received Jan. 2, 2010, Revised on Jun. 18, 2010 and Aug. 19, 2010, pp. 1-12, A shorter version of this paper has been published at the 2nd Workshop on Many-Task Computing on Grids and Supercomputers (MTAGS 2009).

CloverETL Rapid Data Integration, "Products", pp. 1-4, printed on Sep. 24, 2015, <http://www.cloveretl.com/products>.

IBM®, "IBM InfoSphere Information Server VII.5 delivers new integration and governance features", IBM United States Software Announcement 215-345, dated Sep. 15, 2015, 18 pages, Evidence of Grace Period Use or Sale, <http://www-01.ibm.com/common/ssi/cgi-bin/ssialias?infotype=AN&subtype=CA&htmlfid=897/ENUS215-345&appname=USN>.

Bonagiri et al., "Dynamic Node Group Allocation", U.S. Appl. No. 14/945,476, filed Nov. 19, 2015, 35 pages.

IBM, "Appendix P: IBM Patents or Patent Applications Treated as Related", 2 pages, dated Jan. 21, 2016.

* cited by examiner

```
iishd005:/opt/InformationServer/Server/Configurations # vi default.apt
{
  node "node1"
  {
    fastname "iishd005"
    pools ""
    resource disk "/opt/InformationServer/Server/Datasets" {pools ""}
    resource scratchdisk "/opt/InformationServer/Server/Scratch" {pools ""}
  }
  node "node2"
  {
    fastname "iishd007"
    pools ""
    resource disk "/opt/InformationServer/Server/Datasets" {pools ""}
    resource scratchdisk "/opt/InformationServer/Server/Scratch" {pools ""}
  }
  node "node3"
  {
    fastname "iishd009"
    pools ""
    resource disk "/opt/InformationServer/Server/Datasets" {pools ""}
    resource scratchdisk "/opt/InformationServer/Server/Scratch" {pools ""}
  }
}
```

FIG. 5

```
> -- the previously created dummy table has only 1 row, it is used for insert/update
> -- select from the dummy table shows only 1 row.
> select * from dummy;
OK
10
Time taken: 0.105 seconds, Fetched: 1 row(s)

> -- create the table to store info for file name and list of associated nodes
> create table file_nodegroup_info (full_path_file_name string, nodes string);
OK
Time taken: 0.129 seconds > -- the target file name (full path) and the nodes the job writing the file runs on
> -- are stored in the table. Note, the overwrite option is used to make sure
> -- if a record exists it will be overwritten.
> insert overwrite table file_nodegroup_info select '/DS_FILES/file1',
'iishd005,iishd007,iishd009' from dummy;

> -- verify the operation. Both the file name and the list of nodes are correct.
> select * from file_nodegroup_info;
OK
/DS_FILES/file1,iishd005,iishd007,iishd009
Time taken: 0.105 seconds, Fetched: 1 row(s)
```

FIG. 6

```
nodeSet= iishd005,iishd007,iishd009
Create the configuration file for the ETL job using nodeSet.

//This technique makes a request for allocating num_logical resources on the node with name node_name, and the
//maximum time to wait for allocations to succeed is timeOut seconds. Whether the allocation can
//instead be made on any node in the same rack is dictated by the boolean arg sameRackAllowed, in
//case of non-availability of resources on the node 'node_name'.
//Returns the logical resource list, how many ever could be allocated within the timeOut
List<Logical Resource> getLogicalResources(string node_name, int num_logicalresources, int timeOut, bool sameRackAllowed);

bool allocationSucceeded = true;

List<Logical Resource> globalLogicalResourceList;
For each node in nodeSet
{
    List<Logical Resource> allocatedLogicalResources = getLogicalResources(node, num_logicalresources, timeOut, false/*same rack not allowed*/);

if (allocatedLogicalResource.size() < num_logicalresources)
    {
        int remainingLogicalResources = num_logicalresources - allocatedLogicalResources.size();
        //Ask for the remaining Logical Resource on the same rack
        allocatedLogicalResources.add(getLogicalResources(node, remainingLogicalResources, timeOut, true/*same rack allowed*/
        ));;
    }
```

FIG. 7A

```
if (allocatedLogicalResource.size() < num_logicalresource)
{
    int remainingLogicalResource = num_logicalresource - allocatedLogicalResource.size();
    //Ask for the remaining logical resources anywhere in the cluster by specifying "*" for node name
    allocatedLogicalResource.add(getLogicalResource("*", remainingLogicalResources, timeOut, true/*doesn't really matter here*/));
} if (allocatedLogicalResource.size() < num_logicalresource)   //Can't proceed from here
{
    release all the allocated logical resources, both from allocatedLogicalResource as well as globalLogicalResourceList;
    allocationSucceeded = false;
    break;
}
globalLogicalResourceList.add(allocatedLogicalResource);

if (allocationSucceeded == false)
    return with error;
else
{
    //launch ETL processes on the allocated logical resources.
    for each logical resource in globalLogicalResourceList
    {
        get the command to run on the logical resource
        logicalresource.run(command);
    }
}
```

DYNAMIC NODE GROUP ALLOCATION

FIELD

Embodiments of the invention relate to dynamic node group allocation and, in particular, to improving data locality for parallel applications running in big data distributed file system.

BACKGROUND

"Big Data" is often used to refer to a large amount of data. Big Data provides an enhanced approach for business insights. Business insights may be described as spotting problems and opportunities from big data. The Apache™ Hadoop® software framework may be described as a software framework that supports Big Data and that consists of a Hadoop Distributed File System (HDFS™), an Apache™ Hadoop® file system, and Map-Reduce processes (which is a programming model for data processing). (Apache, Hadoop, and Hadoop Distributed File System (HDFS) are trademarks or registered trademarks of the Apache Software Foundation in the United States and/or other countries.) Since the volume of data that the Apache™ Hadoop® software framework handles may be of the internet scale, data should be moved in and out of the HDFS™ efficiently. In many usage scenarios, an Extract, Transform, and Load (ETL) tool is used to bridge the Apache™ Hadoop® software framework and data sources (Relational Database Management Systems (RDBMSs), flat files, etc.), and transform and enrich the data as it flows through.

A parallel application (e.g., an ETL tool) might invoke multiple processes to carry out a task. The defined task may be referred to as a job. The processes of a job of the parallel application may run in parallel in a computer or in multiple computers in a cluster. The job may interact with HDFS™ through an HDFS™ connector. The HDFS™ connector may run in its own process. Multiple instances of the HDFS™ connector may be invoked for parallel execution. When the connector of the parallel application runs in the data source's nodes, it is called running in local mode, whereas, when the connector of the parallel application runs outside of the source's nodes, it is call running in remote mode.

To understand the performance characteristics of the parallel application, assume that a cluster is arranged with 6 nodes, 1 dedicated for the parallel application, 1 dedicated for a name node, and 4 for data nodes. Each of the data nodes stores data. The name node maintains a directory tree of the files in the HDFS™ and tracks where across a cluster the file data is kept. The parallel application contacts the name node to access a file, and the name node returns a list of the one or more data nodes that store the file data. When the parallel application runs in remote mode, the parallel application only runs in the dedicated computer for this parallel application, whereas, when the parallel application runs in local mode, the HDFS™ connector of the parallel application will run in the data nodes.

When running in local mode (running the HDFS™ connector of the parallel application in the data nodes), because there is no guarantee for data locality, read operations may incur excessive network and Input/Output (IO) activities.

For example, for write operations, when running the parallel application in local mode, the total CPU utilization of the data nodes is 211%, compared to 56% when the parallel application is running in remote mode; whereas the CPU utilization of the dedicated node for the parallel application goes down from saturation (90%) to only 1%. This is an indication that the parallel application offloaded the work to the data nodes by running the HDFS™ connector of the parallel application in the data nodes. The network write throughput increased, indicating an increase of total workload throughput. Also, for read operations, network and disk Input/Output (I/O) activities increase. This is caused by the fact that data locality cannot be guaranteed when running the HDFS™ connector in the data nodes. The performance results were impacted by these system resource utilization patterns.

As for the performance comparison of the parallel application when running in remote mode versus local mode, while for write operations running the HDFS™ connector in local mode helps the parallel application performance, for read operations running HDFS™ connector in local mode degrades performance. For example, for write operations running the HDFS™ connector in local mode, performance improved 64% and 44% for 20 and 40 concurrent writers respectively. However, for read operations running the HDFS™ connector in local mode, performance is 19% and 25% as running remote mode for 20 and 40 concurrent readers respectively. This defeats the purpose of running HDFS™ connector in data sources to offload some work to the data source and improve performance.

Based on the aforementioned analysis, the poor performance of running the HDFS™ connector in local mode is caused by excessive network and disk I/O that was caused by the HDFS™ connector not always getting data blocks in the data nodes where the HDFS™ connector instance runs.

To complete a task, an application may send a sequence of jobs to run in a cluster. A job of a parallel application or some parts of the job may run in parallel across multiple nodes with data partitioning. The job may produce data that is consumed later by one or more downstream jobs. The data is saved as a file in HDFS™.

Where the jobs are run in the cluster may be determined based on certain constraints and resource management policies of a workload management system. An example of the constraints that limit the nodes on which a job can run is may be: 1) whether the job needs to access a remote database, and 2) whether the job must run in the nodes that are enabled for accessing a remote database. Since system resource utilization keeps changing dynamically, there is no guarantee that a downstream job that consumes the file runs in the same nodes as the job that produces the file does. If the downstream job runs in different nodes, then, the downstream job may not retrieve the data blocks locally and that may incur excessive network and I/O operations and cause poor performance. This is sometimes referred to as a data locality issue.

Certain conventional systems guarantee reading the data block locally by querying the name node to obtain the location of the block, then sending the task that reads the block to its known location. But this may not work for parallel applications because an operator handles the data of a whole partition that may be stored in multiple data blocks across multiple nodes in the cluster. The operator will be in the same container (or logical resource) and the same data node in the duration of processing the whole data of a partition.

SUMMARY

Provided is a method for improving data locality for parallel applications running in a big data distributed file system with a dynamic node group. The method comprises: in response to a consumer job starting to read one or more files in a big data distributed file system having multiple nodes, retrieving node group information for the one or more files to be read, wherein the node group information identifies nodes from the multiple nodes on which a producer job wrote the one or more files; and assigning the consumer job to the nodes identified by the node group information to allow for local reading of the one or more files by the consumer job.

Provided is a computer system for improving data locality for parallel applications running in a big data distributed file system with a dynamic node group. The computer system comprises: one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform: in response to a consumer job starting to read one or more files in a big data distributed file system having multiple nodes, retrieving node group information for the one or more files to be read, wherein the node group information identifies nodes from the multiple nodes on which a producer job wrote the one or more files; and assigning the consumer job to the nodes identified by the node group information to allow for local reading of the one or more files by the consumer job.

Provided is a computer program product for improving data locality for parallel applications running in a big data distributed file system with a dynamic node group. The computer program product comprises a computer readable storage medium having program code embodied therewith, the program code executable by at least one processor to perform: in response to a consumer job starting to read one or more files in a big data distributed file system having multiple nodes, retrieving node group information for the one or more files to be read, wherein the node group information identifies nodes from the multiple nodes on which a producer job wrote the one or more files; and assigning the consumer job to the nodes identified by the node group information to allow for local reading of the one or more files by the consumer job.

BRIEF DESCRIPTION OF THE SEVERAL VIEWS OF THE DRAWINGS

Referring now to the drawings in which like reference numbers represent corresponding parts throughout:

FIG. 5 illustrates an example of a configuration file in accordance with certain embodiments.

FIG. 6 illustrates Data Definition Language (DDL) statements and Data Manipulation Language (DML) statements for storing node group information in accordance with certain embodiments.

FIGS. 7A and 7B illustrated program logic for requesting logical resources from the workload management system in accordance with certain embodiments.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
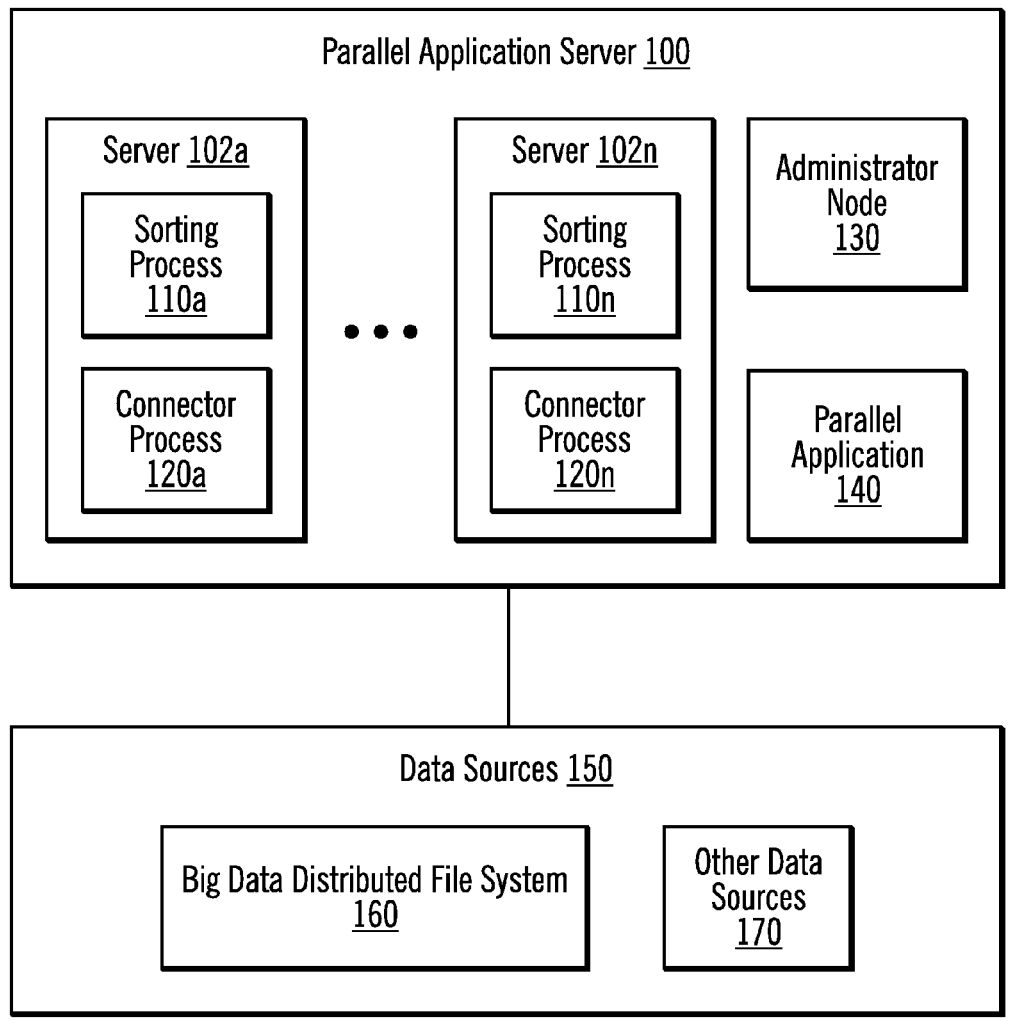
FIG. 1 illustrates, in a block diagram, a computing environment in accordance with certain embodiments.

FIG. 1 illustrates, in a block diagram, a computing environment in accordance with certain embodiments. A parallel application server 100 includes servers 102a . . . 102n (e.g., compute nodes), an administrator node 130, and a parallel application 140. The ellipses in FIG. 1 between the server 102a and the server 102n indicates that there may be any number of servers in the computing environment. In certain embodiments, the parallel application server 100 may be an ETL server. The server 102a may run one or more jobs, and each of the jobs may consist of multiple processes, for example, a sorting process 110a and a connector process 120a. Similarly, the server 102n may run one or more jobs, and each of the jobs may consist of multiple processes, for example, a sorting process 110n and a connector process 120n. The servers 102a . . . 102n may operate in parallel to process data in a data partitioning manner. The servers 102a . . . 102n may be described as server computers.

The parallel application server 100 is coupled to data sources 150. The data sources 150 include a big data distributed file system 160 (e.g., HDFS™) and other data sources 170 (e.g., RDBMS databases, cloud storage, Extensible Markup Language (XML) files, etc.).

The processes 110a . . . 110n and processes 120a . . . 120n may exchange information with each other and with data sources 150.

The parallel application server 100 executes the parallel application 140 that processes Big Data and may exchange information with the big data distributed file system 160 and data sources 170 (collectively called data sources 150 herein). Such exchange of information may be used to move enterprise information into a Big Data source, such as the big data distributed file system 160, so that the enterprise information may be included in analytics. Such exchange of information may also be used to take analytical results of the big data distributed file system 160 and apply the analytical results to other Information Technology (IT) solutions.

The parallel application server 100 exchanging data with the big data distributed file system 160 may be massively scalable. With the parallel processing, there is a scale-out design that may be expanded by adding new hardware (e.g., servers). The parallel distributed file system 100 may aggressively use system resources (Central Processing Unit (CPU), memory, network I/O, disk I/O, etc.) for high speed data processing. With these two characteristics, it may be desirable in some data integration scenarios to include the compute nodes that the data sources 150 are running on to be designated as a part of the parallel application server 100. For example, when the parallel application server 100 needs to run a large job, the dedicated computers running the parallel application server 100 may be bound by system resources (e.g., CPU, I/O, etc.). If the parallel application server 100 is able to offload some of the work to the data sources 150, the overall performance may be improved. One way to implement this is to configure the computers running the data sources 150 to also serve as compute nodes of the parallel application server 100. Then, the parallel application server connectors, used to talk to the data sources 150 and parse the data, may be assigned to run in those compute nodes.

When a connector of the parallel application server 100 runs in the data source's nodes, it is called running in local mode, whereas, when a connector of the parallel application server 100 runs outside of the source's nodes, it is call running in remote mode.

Figure 2:
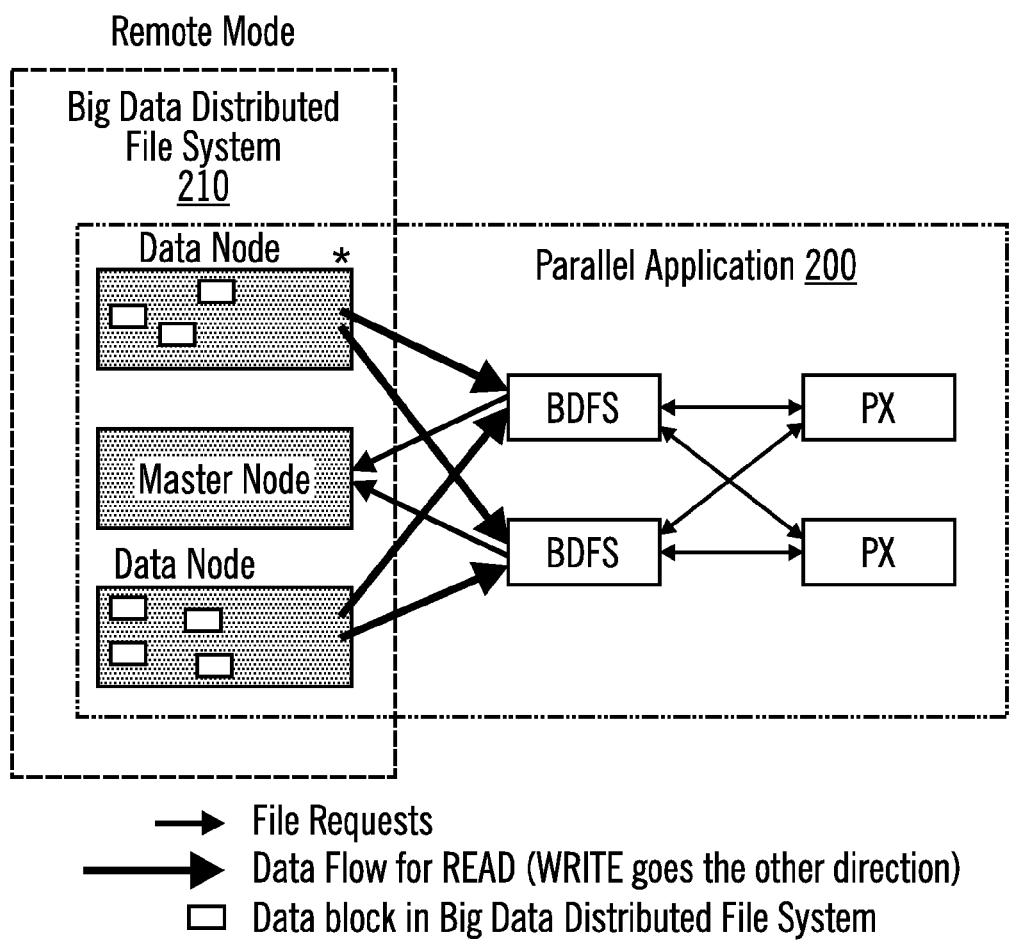
FIG. 2 illustrates operations when running in remote mode in accordance with certain embodiments.

FIG. 2 illustrates operations when running in remote mode in accordance with certain embodiments. In FIG. 2, Big Data File System Stage (BDFS) represents a big data distributed file system connector. Also, in FIG. 2, a parallel processing engine of the parallel application (e.g., of an ETL server) is represented by PX. When running in remote mode, the instances of the big data distributed file system connector of the parallel application server 200 run outside of a big data distributed file system 210. When reading from the big data distributed file system 210, the big data distributed file system connector first sends a request to the master node to obtain location information of the data block to be retrieved. In certain embodiments, the master node of the big data distributed file system 210 maintains information about which data nodes store which data blocks of the files. With the information, the big data distributed file system connector gets the data directly from the data node where the data block resides (via a Remote Procedure Call (RPC)). When writing to the big data distributed file system 210, the big data distributed file system connector first sends a request to the master node to obtain location information the data block to be written. Then, the big data distributed file system connector makes an RPC call directly to the data node and writes the data block.

Figure 3:
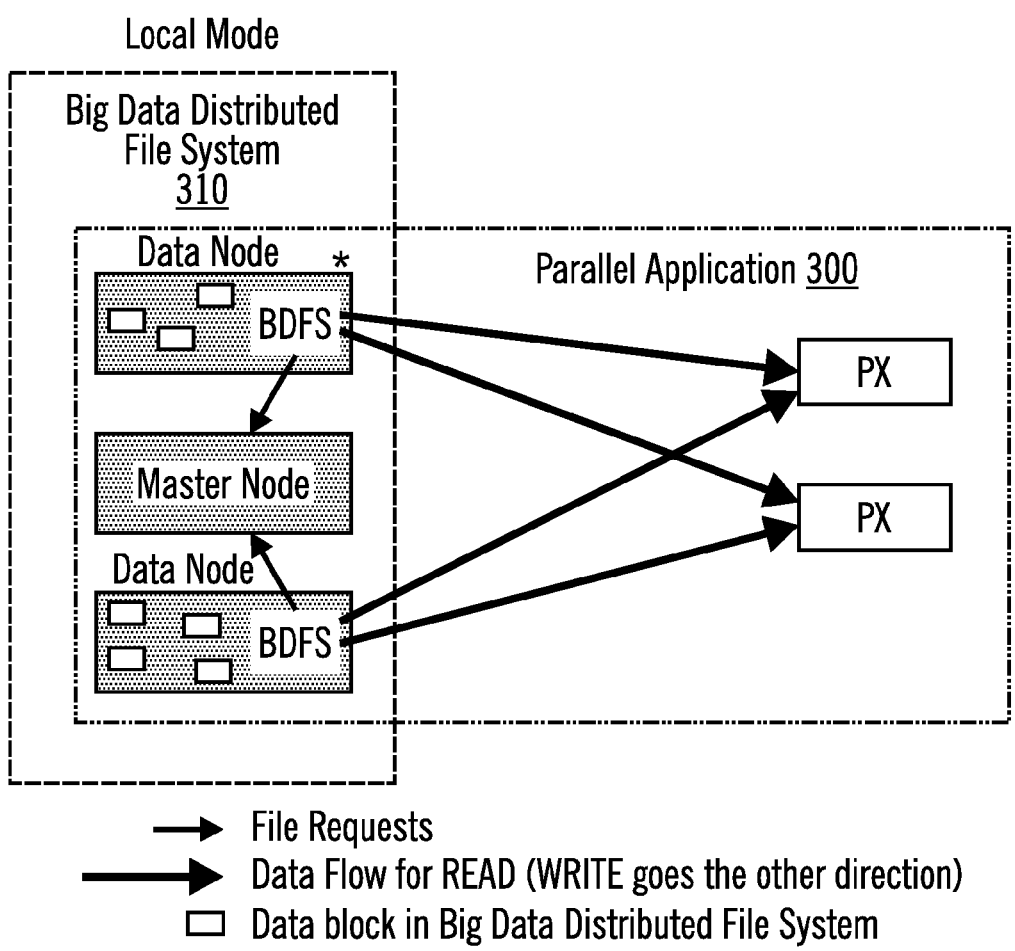
FIG. 3 illustrates operations when running in local mode in accordance with certain embodiments.

FIG. 3 illustrates operations when running in local mode in accordance with certain embodiments. In FIG. 3, Big Data File System Stage (BDFS) represents a big data distributed file system connector. Also, in FIG. 3, a parallel processing engine of the parallel application (e.g., of an ETL server) is represented by PX. When running in local mode, the instances of the big data distributed file system connector of the parallel application server 300 run in a big data distributed file system 310. The big data distributed file system connector first sends a request to the master node to obtain location information of which data node to read or write the data block. For write operations, because of the data locality principle of the big data distributed file system 310, the data blocks are designated to write locally to where the big data distributed file system connector runs. However, for read operations, the big data distributed file system 300 does not guarantee data locality. That is, a data block to be retrieved by a big data distributed file system connector can reside in a data node different from where the big data distributed file system connector runs.

Embodiments solve or at least alleviate the data locality issue by using a dynamic node group mechanism. A node group that normally includes a list of nodes is used by the parallel application server 100 to define which nodes a job will run on. In certain embodiments, one or more parts of a job run in a certain node pool (a subset of a node group).

Embodiments use a dynamically defined node group to run the jobs in an Apache™ Hadoop® cluster of nodes. For the parallel application server 100, the list of nodes a job runs on is specified in a configuration file. To dynamically generate a configuration file for a job to run is to dynamically assign a node group for the job.

With embodiments, a producer job is a job that writes files in the big data distributed file system, and a consumer job reads from those files in the big data distributed file system. When a producer job writes files to the big data distributed file system, the producer job stores node group information that includes a full path file names for each of one or more files, along with the information of the nodes where the job runs. The node group information may be stored in a data storage management system table, such as an Apache™ HIVE™ table. (HIVE is a trademark or registered trademark of the Apache Software Foundation in the United States and/or other countries.) When the consumer job runs, the consumer job first retrieves the node group information of the one or more files the consumer job needs to read from, uses this information to request logical resources (also referred to as containers) from the workload management system, and dynamically generates a configuration file for the job. Logical resources may be described as a specific amount of resources (e.g., memory, central processing unit, etc.). . If logical resources cannot be allocated in the exact set of nodes that are in the node group information, the consumer job attempts to allocate logical resources in nodes as physically close as possible (i.e., in the same rack (e.g., a metal frame that stores computers), physically close to each other, etc.). If the consumer job runs in the exact set of nodes as the producer job, (writing to the big data distributed file system writes a local copy of data in the node where it runs), data locality is provided. If the consumer job runs in the nodes close to the nodes that the producer jobs run, the data locality issue is alleviated, i.e., by going through shorter network paths when retrieving data from the big data distributed file system.

Embodiments leverage data locality with dynamic node group allocation for the parallel application server 100. Embodiments record and store away information of one or more files, along with node group information for the producer job. For the consumer job of the one or more files, embodiments use the node group information when requesting logical resources from the workload management system. Then, the node group is used as a soft constraint when allocating logical resources from the logical resources cannot be allocated in the exact set of nodes, embodiments attempt to allocate logical resources in nodes as close to the node group as possible.

Merely to enhance understanding, examples of embodiments will be provided herein. However, it is to be understood that embodiments are not limited to these examples.

In one example, Job1 runs in 4-way parallelism writes to a parallel data set (4 files in the big data distributed file system). Job2 reads the data set (the 4 files in the big data distributed file system) written by Job1. Job2 also runs in 4 ways. If Job2 runs in the same set of nodes as Job1 did, Job2 reads data blocks locally or at least from nodes physical close to nodes in the node group. Thus, embodiments avoid having Job2 run in other, physically remote nodes from which Job2 is not able to read the data blocks locally or nodes as physically close as possible.

How the elements of this invention apply to the solution is shown as the following (read data blocks locally as much as possible):

1. Job1 writes to 4 files in the big data distributed file system and records which nodes the job runs (i.e., in a table).

2. When Job2 is about to run, in the prepare phase, the parallel application 140 retrieves the node group information (i.e., from the table), sends requests to the workload management system to get logical resources in these nodes. If the logical resources are successfully obtained, the parallel application 140 dynamically generates a configuration file with the logical resources on the nodes for the job to run on.

3. If the parallel application 140 fails to get logical resources in the exact set of nodes, the parallel application 140 tries again and gets the next closest nodes and generates a configuration file for Job2 dynamically with these closest nodes.

The list of nodes the parallel application server 100 job (e.g., the producer job) runs on is specified in a configuration file. When Job1 is writing to a file in the big data distributed file system, the file name (full path file name) and the nodes that the job runs on are recorded and stored away (i.e., in a table). When Job2 is reading data from the big data distributed file system, to make sure that Job2 runs on the nodes where the data is, the parallel application 140 attempts to create the configuration file with the list of nodes the producer job ran on because that is where the data (a local copy of the data blocks) is stored.

When the parallel application 140 fails to get resources for the job on the nodes specified in the configuration file, then, the parallel application 140 attempts to get the resources allocated somewhere on the same rack and runs the job on those nodes. In case getting the resources on the same rack is also not possible, the parallel application 140 attempts to get resources anywhere in the cluster or waits for a user defined amount of time to try again to obtain resources on same node/rack that stores the data to be processed.

Figure 4A:
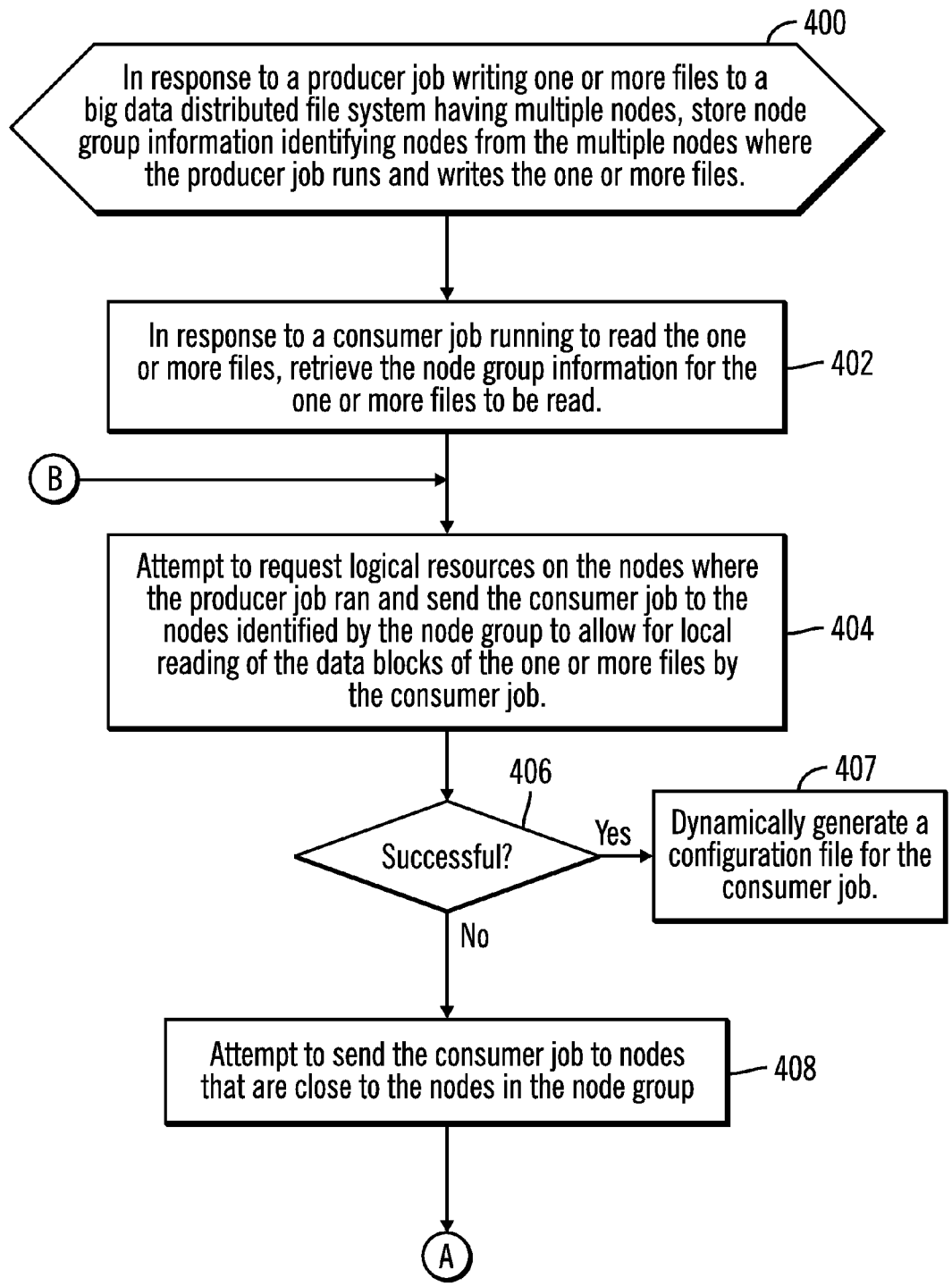
FIGS. 4A-4B illustrate operations for allocating logical resources on nodes in accordance with certain embodiments.
Figure 4B:
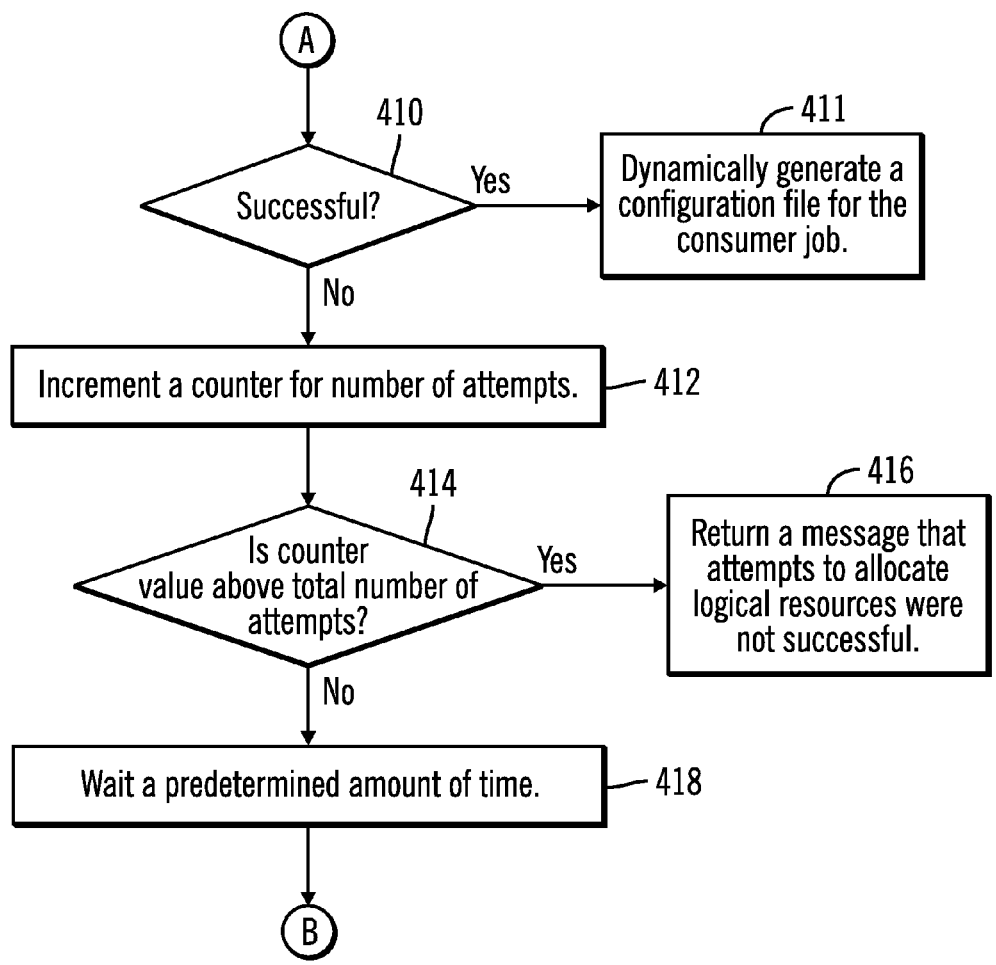

FIGS. 4A-4B illustrate operations for allocating logical resources on nodes in accordance with certain embodiments. Control begins at block 400, in response to a producer job writing one or more files to the big data distributed file system having multiple nodes, with the producer job storing node group information identifying nodes from the multiple nodes where the producer job runs and writes the one or more files. In block 402, in response to a consumer job starting (e g , running) to read the one or more files, the parallel application 140 retrieves the node group information for the one or more files to be read.

In block 404, the parallel application 140 attempts to request logical resources on the nodes where the producer job ran and send the consumer job to the nodes identified by the node group to allow for local reading of the data blocks of the one or more files by the consumer job. In block 406, the parallel application 140 determines whether the attempt in block 404 was successful. If so, processing continues to block 407, otherwise, processing continues to block 408. In block 407, the parallel application 140 dynamically generates a configuration file for the consumer job. The configuration file identifies the nodes on which the consumer job is to run. Then, the consumer job is executed ("run") on the identified nodes.

In block 408, the parallel application 140 attempts to send the consumer job to nodes that are close to the node group. From block 408 (FIG. 4A), processing continues to block 410 (FIG. 4B). In block 410, the parallel application 140 determines whether the attempt in block 408 was successful. If so, processing continues to block 411, otherwise, processing continues to block 412. In block 411, the parallel application 140 dynamically generates a configuration file for the consumer job. The configuration file identifies the nodes on which the consumer job is to run. Then, the consumer job is executed ("run") on the identified nodes.

In block 412, the parallel application 140 increments a counter for a number of attempts. That is, a counter may be set (e.g., by a user or system administrator) to indicate how many times the attempt to allocate the logical resources in blocks 404 and 408 should be tried. In block 414, the parallel application 140 determines whether the counter value is above a total number of attempts already completed. If so, processing continues to block 416, otherwise, processing continues to block 418.

In block 416, the parallel application 140 returns a message that attempts to allocate logical resources were not successful.

In block 418, the parallel application 140 waits a predetermined amount of time, and then processing continues from block 418 (FIG. 4B) to block 404 (FIG. 4A).

FIG. 5 illustrates an example of a configuration file 500 in accordance with certain embodiments. In the configuration file 500, fastname points to the hosts where the consumer job is to run. In this example, the job assigned with the configuration file runs on 3 nodes, iishd005, iishd007, and iishd009. If a job that is assigned to run with the default. apt configuration file writes to a file in the big data distributed file system, for example/DS_FILES/file1, both the file name and the list of nodes the job runs on will be stored.

FIG. 6 illustrates Data Definition Language (DDL) statements and Data Manipulation Language (DML) statements 600 for storing node group information in accordance with certain embodiments. In certain embodiments, Common Language Infrastructure (CLI) calls may be used to show the sequence of statements. These calls may be changed to Web Application Programming Interface (API) calls in other embodiments.

When Job2 is reading from/DS_FILES/file1, first the information of the list of nodes that the producer of the file ran on will be retrieved from the table storing node group information with the following:

```
> select nodes from file_nodegroup_info where
full_path_file_name='/DS_FILES/file1';
OK
iishd005,iishd007,iishd009
```

Now the node group information of the list of nodes is retrieved, and the parallel application 140 uses this node group information to request logical resources from the workload management system of the big data distributed file system and construct a configuration file for Job2. FIGS. 7A and 7B illustrate program logic 700, 710 for requesting logical resources from the workload management system in accordance with certain embodiments.

Thus, when running parallel applications in the big data distributed file system through the workload management system, if data cannot be accessed locally by the parallel applications, the parallel applications will generate excess network traffic and cause poor performance. Embodiments remember the set of nodes a producer job runs on and use this node group information to request, from the workload management system, logical resources in the same set of nodes for the consumer job of the big data distributed file system. If the logical resources cannot be obtained from the set of nodes, they will be requested to be allocated as close as possible to those nodes. This increases the possibility of the consumer application reading data locally in the data nodes.

With embodiments, a dynamically allocated node group is used to constrain where the consumer job is to run to leverage data locality.

Embodiments improve the I/O time by assuring data locality for the applications run on the big data distributed file system.

Cloud Embodiments

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 8:
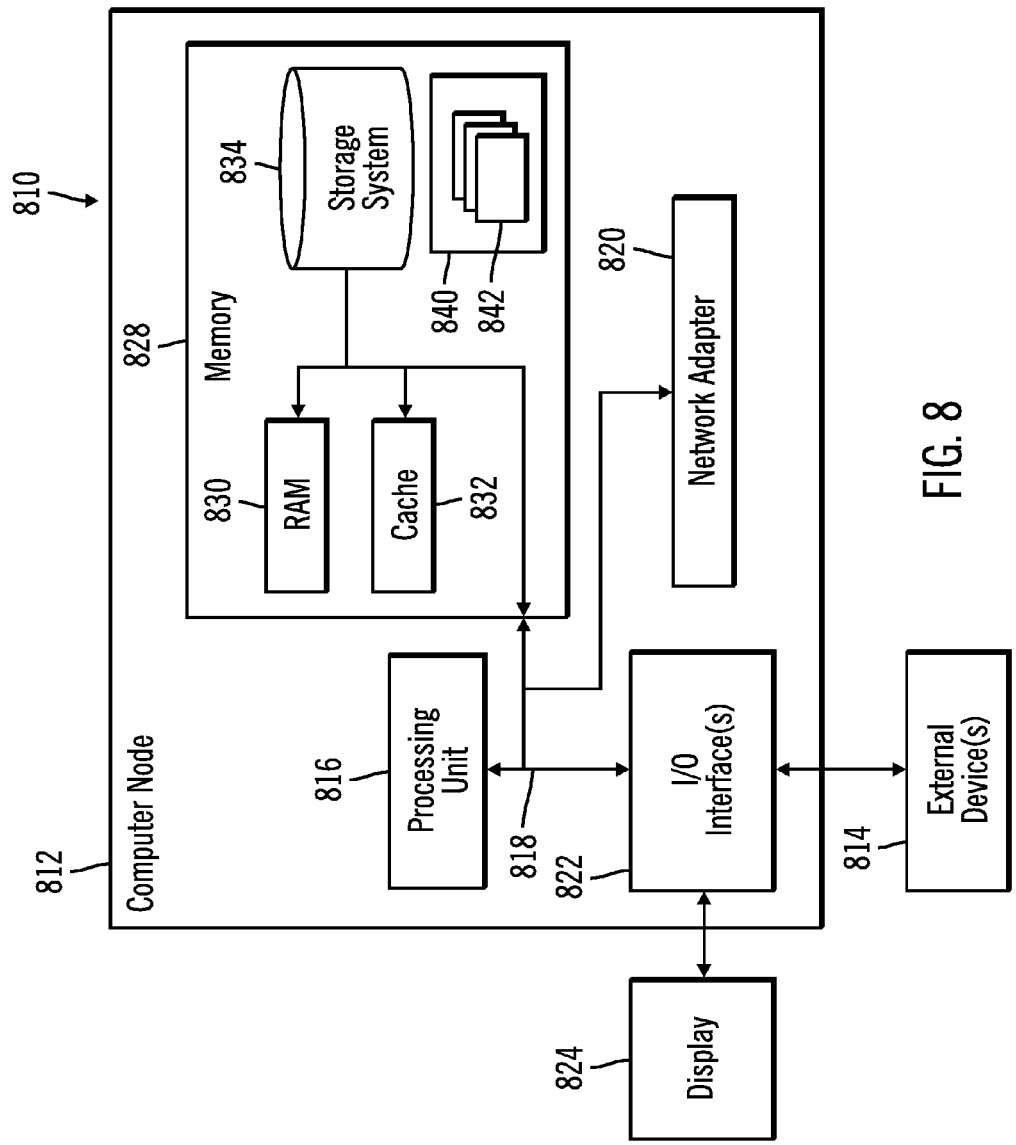
FIG. 8 illustrates a cloud computing node in accordance with certain embodiments.

Referring now to FIG. 8, a schematic of an example of a cloud computing node is shown. Cloud computing node 810 is only one example of a suitable cloud computing node and is not intended to suggest any limitation as to the scope of use or functionality of embodiments of the invention described herein. Regardless, cloud computing node 810 is capable of being implemented and/or performing any of the functionality set forth hereinabove.

In cloud computing node 810 there is a computer system/server 812, which is operational with numerous other general purpose or special purpose computing system environments or configurations. Examples of well-known computing systems, environments, and/or configurations that may be suitable for use with computer system/server 812 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 812 may be described in the general context of computer system executable instructions, such as program modules, being executed by a computer system. Generally, program modules may include routines, programs, objects, components, logic, data structures, and so on that perform particular tasks or implement particular abstract data types. Computer system/server 812 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 812 in cloud computing node 810 is shown in the form of a general-purpose computing device. The components of computer system/server 812 may include, but are not limited to, one or more processors or processing units 816, a system memory 828, and a bus 818 that couples various system components including system memory 828 to processor 816.

Bus 818 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 812 typically includes a variety of computer system readable media. Such media may be any available media that is accessible by computer system/server 812, and it includes both volatile and non-volatile media, removable and non-removable media.

System memory 828 can include computer system readable media in the form of volatile memory, such as random access memory (RAM) 830 and/or cache memory 832.

Computer system/server 812 may further include other removable/non-removable, volatile/non-volatile computer system storage media. By way of example only, storage system 834 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 818 by one or more data media interfaces. As will be further depicted and described below, memory 828 may include at least one program product having a set (e.g., at least one) of program modules that are configured to carry out the functions of embodiments of the invention.

Program/utility 840, having a set (at least one) of program modules 842, may be stored in memory 828 by way of example, and not limitation, as well as an operating system, one or more application programs, other program modules, and program data. Each of the operating system, one or more application programs, other program modules, and program data or some combination thereof, may include an implementation of a networking environment. Program modules 842 generally carry out the functions and/or methodologies of embodiments of the invention as described herein.

Computer system/server 812 may also communicate with one or more external devices 814 such as a keyboard, a pointing device, a display 824, etc.; one or more devices that enable a user to interact with computer system/server 812; and/or any devices (e.g., network card, modem, etc.) that enable computer system/server 812 to communicate with one or more other computing devices. Such communication can occur via Input/Output (I/O) interfaces 822. Still yet, computer system/server 812 can communicate with one or more networks such as a local area network (LAN), a general wide area network (WAN), and/or a public network (e.g., the Internet) via network adapter 820. As depicted, network adapter 820 communicates with the other components of computer system/server 812 via bus 818. It should be understood that although not shown, other hardware and/or software components could be used in conjunction with computer system/server 812. Examples, include, but are not limited to: microcode, device drivers, redundant processing units, external disk drive arrays, RAID systems, tape drives, and data archival storage systems, etc.

Figure 9:
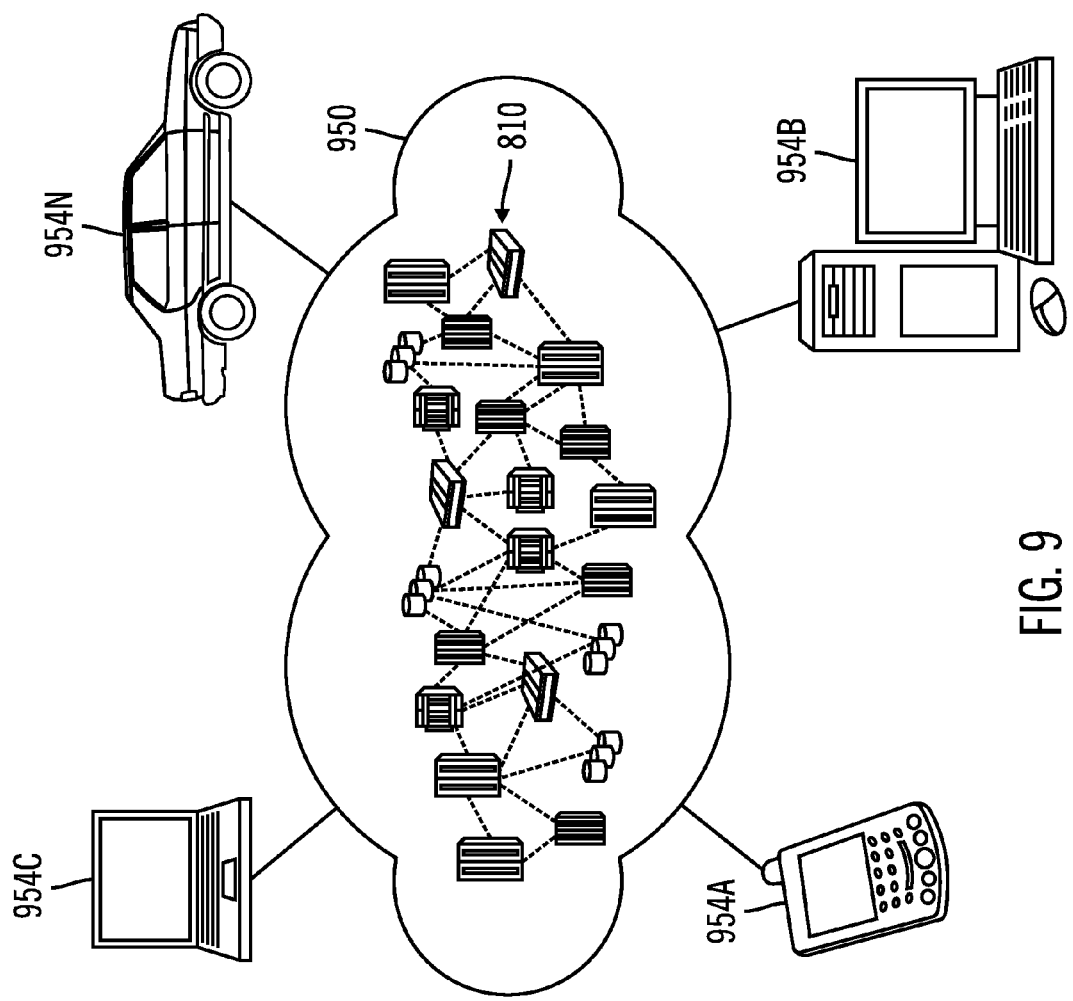
FIG. 9 illustrates a cloud computing environment in accordance with certain embodiments.
Figure 10:
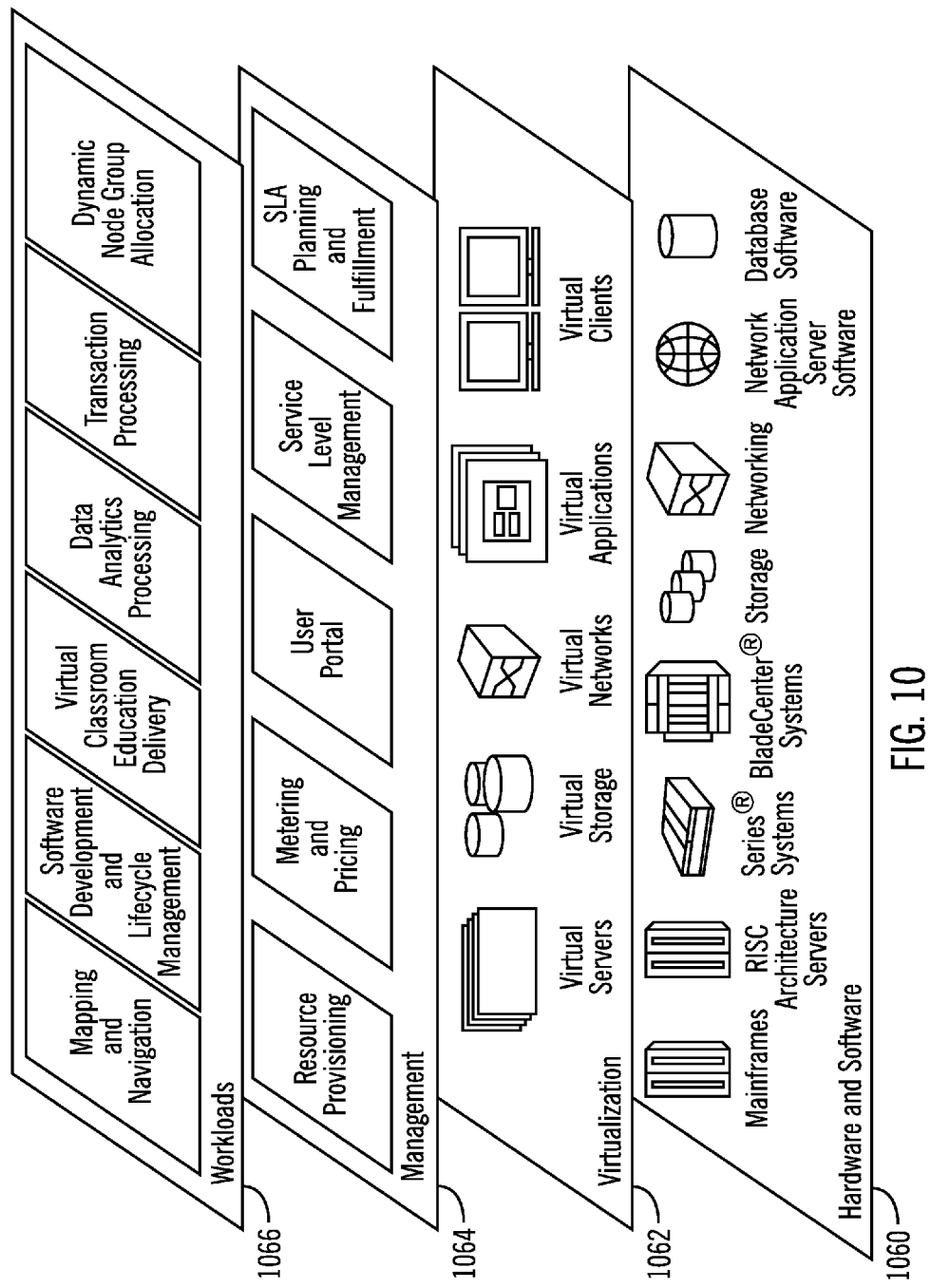
FIG. 10 illustrates abstraction model layers in accordance with certain embodiments.

Referring now to FIG. 9, illustrative cloud computing environment 950 is depicted. As shown, cloud computing environment 950 comprises one or more cloud computing nodes 810 with which local computing devices used by cloud consumers, such as, for example, personal digital assistant (PDA) or cellular telephone 954A, desktop computer 954B, laptop computer 954C, and/or automobile computer system 954N may communicate. Nodes 810 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 810 and cloud computing environment 950 can communicate with any type of computerized device over any type of network and/or network addressable connection (e.g., using a web browser).

Referring now to FIG. 80, a set of functional abstraction layers provided by cloud computing environment 950 (FIG. 9) is shown. It should be understood in advance that the components, layers, and functions shown in FIG. 80 are intended to be illustrative only and embodiments of the invention are not limited thereto. As depicted, the following layers and corresponding functions are provided:

Hardware and software layer 8060 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 8062 provides an abstraction layer from which the following examples of virtual entities may be provided: virtual servers; virtual storage; virtual networks, including virtual private networks; virtual applications and operating systems; and virtual clients.

In one example, management layer 8064 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 8066 provides examples of functionality for which the cloud computing environment may be utilized. Examples of workloads and functions which may be provided from this layer include: mapping and navigation; software development and lifecycle management; virtual classroom education delivery; data analytics processing; transaction processing; and dynamic node group allocation.

Thus, in certain embodiments, software or a program, implementing dynamic node group allocation in accordance with embodiments described herein, is provided as a service in a cloud environment.

In certain embodiments, server 102*a* . . . 102*n* each has the architecture of computing node 810. In certain embodiments, the server 102*a* . . . 102*n* are part of a cloud environment. In certain alternative embodiments, server 102*a* . . . 102*n* are not part of a cloud environment.

Additional Embodiment Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
connecting a parallel application server to a data source structure, wherein the data source structure contains a big data distributed file system, wherein the big data distributed file system contains multiple nodes and data blocks;
in response to the parallel application operating the data source structure within the multiple nodes of the big data distributed file system, the parallel application server and the data source structure performing read and write operations on the data blocks in a local mode setting;
in response to the parallel application operating the data source structure outside of the multiple nodes of the big data distributed file system, the parallel application server and the data source structure performing read and write operations on the data blocks in a remote mode setting;
in response to a consumer job starting to read one or more files in the big data distributed file system, retrieving node group information for the one or more files to be read, wherein the node group information identifies nodes from the multiple nodes on which a producer job wrote the one or more files;
implementing a node grouping mechanism to read and write the data blocks within the local mode setting over the remote mode setting;
assigning the consumer job to the nodes identified by the node group information to allow for reading of the one or more files by the consumer job within the local mode setting, wherein the local mode setting reads and writes the data blocks;
in response to assigning the consumer job to the nodes identified by the node group information, generating a configuration file, wherein the configuration file comprises a dynamically generated configuration file and a non-dynamically generated configuration file;
wherein the dynamically generated configuration file corresponds to the consumer job and the dynamically generated configuration file is dynamically assigned to the node group for the consumer job;
in response to retrieving the node group information, requesting logical resources;
executing the consumer job with the configuration file identifying the nodes on which the consumer job is to run; and
in response to determining that logical resources cannot be allocated in the nodes identified by the node group information, attempting to allocate logical resources in nodes close to the nodes identified by the node group information.

2. The method of claim 1, further comprising:
storing a full path file name along with the node group information in a table.

3. The method of claim 1, wherein software is provided as a service in a cloud environment.

4. A computer system, comprising:
one or more processors, one or more computer-readable memories and one or more computer-readable, tangible storage devices;
a parallel application server connected to a data source structure, wherein the data source structure contains a big data distributed file system, wherein the big data distributed file system contains multiple nodes and data blocks; and
program instructions, stored on at least one of the one or more computer-readable, tangible storage devices for execution by at least one of the one or more processors via at least one of the one or more memories, to perform:
in response to the parallel application operating the data source structure within the multiple nodes of the big data distributed file system, the parallel application server and the data source structure performing read and write operations on the data blocks within a local mode setting;
in response to the parallel application operating the data source structure outside the multiple nodes of the big data distributed file system, the parallel application server and the data source structure performing read and write operations on the data blocks within a remote mode setting;
in response to a consumer job starting to read one or more files in the big data distributed file system, retrieving node group information for the one or more files to be read, wherein the node group information identifies nodes from the multiple nodes on which a producer job wrote the one or more files;
implementing a node grouping mechanism to read and write the data blocks within the local mode setting over the remote mode setting;
assigning the consumer job to the nodes identified by the node group information to allow for reading of the one or more files by the consumer job within the local mode setting, wherein the local mode setting reads and writes the data blocks;
in response to assigning the consumer job to the nodes identified by the node group information, generating a configuration file, wherein the configuration file comprises a dynamically generated configuration file and a non-dynamically generated configuration file;
wherein the dynamically generated configuration file corresponds to the consumer job and the dynamically generated configuration file is dynamically assigned to the node group for the consumer job;
in response to retrieving the node group information, requesting logical resources;
executing the consumer job with the configuration file identifying the nodes on which the consumer job is to run; and in response to determining that logical resources cannot be allocated in the nodes identified by the node group information, attempting to allocate logical resources in nodes close to the nodes identified by the node group information.

5. The computer system of claim 4, wherein the operations further comprise:
storing a full path file name along with the node group information in a table.

6. The computer system of claim 4, wherein a Software as a Service (SaaS) is configured to perform the system operations.

7. A computer program product, the computer program product comprising a computer readable storage medium having program code embodied therewith, the program code executable by at least one processor to perform:
connecting a parallel application server to a data source structure, wherein the data source structure contains a big data distributed file system, wherein the big data distributed file system contains multiple nodes and data blocks;
in response to the parallel application operating the data source structure within the multiple nodes of the big data distributed file system, the parallel application server and the data source structure perform read and write operations on the data blocks within a local mode setting;
in response to the parallel application operating the data source structure outside the multiple nodes of the big data distributed file system, the parallel application server and the data source structure perform read and write operations on the data blocks within a remote mode setting;
in response to a consumer job starting to read one or more files in the big data distributed file system, retrieving node group information for the one or more files to be read, wherein the node group information identifies nodes from the multiple nodes on which a producer job wrote the one or more files;
implementing a node grouping mechanism to read and write the data blocks within the local mode setting over the remote mode setting;
assigning the consumer job to the nodes identified by the node group information to allow for reading of the one or more files by the consumer job within the local mode setting, wherein the local mode setting reads and writes the data blocks;
in response to assigning the consumer job to the nodes identified by the node group information, generating a configuration file, wherein the configuration file comprises a dynamically generated configuration file and a non-dynamically generated configuration file;
wherein the dynamically generated configuration file corresponds to the consumer job and the dynamically generated configuration file is dynamically assigned to the node group for the consumer job;
in response to retrieving the node group information, requesting logical resources;
executing the consumer job with the configuration file identifying the nodes on which the consumer job is to run; and
in response to determining that logical resources cannot be allocated in the nodes identified by the node group information, attempting to allocate logical resources in nodes close to the nodes identified by the node group information.

8. The computer program product of claim 7, wherein the program code is executable by at the least one processor to perform:
storing a full path file name along with the node group information in a table.

9. The computer program product of claim 7, wherein a Software as a Service (SaaS) is configured to perform the computer program product operations.

* * * * *